US006200686B1

(12) United States Patent
Ozaki et al.

(10) Patent No.: US 6,200,686 B1
(45) Date of Patent: Mar. 13, 2001

(54) UNSATURATED POLYESTER RESIN COMPOSITION, MOLDING USING THE SAME, AND PRODUCTION PROCESS THEREOF

(75) Inventors: Yukinori Ozaki, Akashi; Tsugishige Iwaki, Takatsuki, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/441,296

(22) Filed: Nov. 16, 1999

(30) Foreign Application Priority Data

Nov. 17, 1998 (JP) .................................... 10-326982

(51) Int. Cl.⁷ .............................. C08L 67/06; B32B 7/10; B32B 27/26

(52) U.S. Cl. ......................... 428/482; 525/168; 525/169; 525/170; 264/241; 264/308; 264/331.8

(58) Field of Search ..................................... 525/170, 168, 525/169; 428/482; 264/241, 308, 331.8

(56) References Cited

U.S. PATENT DOCUMENTS 4,626,570 * 12/1986 Gardner ................................. 525/12

* cited by examiner

*Primary Examiner*—Patricia A. Short
(74) *Attorney, Agent, or Firm*—Oblon, Spivak, McClelland, Maier & Neustadt, P.C.

(57) ABSTRACT

An unsaturated polyester resin composition includes: (A) 100 parts by weight of an unsaturated polyester having a dicyclopentenyl group; (B) 20 to 100 parts by weight of a polymerizable aromatic vinyl monomer; (C) 0.5 to 20 parts by weight of a polymerizable aliphatic vinyl monomer; and (D) 50 to 10000 ppm of a thermoplastic polymer relative to the total weight of the components (A), (B) and (C), in which the thermoplastic polymer is soluble in the polymerizable aliphatic vinyl monomer, and the weight ratio (D/C) of the component (D) to the component (C) is equal to or less than $1/5$. The unsaturated polyester resin composition can provide a laminated or joint monolithic molding having markedly high secondary bond strength without deteriorating inherent drying characteristics of the unsaturated polyester resin composition having a dicyclopentenyl group. Moldings obtained by using the resin composition are also provided.

10 Claims, 5 Drawing Sheets

UNSATURATED POLYESTER RESIN COMPOSITION

UNSATURATED POLYESTER RESIN COMPOSITION, MOLDING USING THE SAME, AND PRODUCTION PROCESS THEREOF

BACKGROUND OF THE INVENTION

1. Field of the Invention

The present invention relates to an unsaturated polyester resin composition, to a molding produced with the use of this composition, and to a production process of the molding, which unsaturated polyester resin composition can provide laminate moldings or joint monolithic moldings of an unsaturated polyester resin satisfactory in adhesiveness (secondary adhesiveness) between cured articles of unsaturated polyester resins, especially of glass fiber reinforced unsaturated polyester resins.

2. Description of the Related Art

Fiber reinforced plastic products using unsaturated polyester resins are light in weight, satisfactory in corrosion resistance, heat resistance and mechanical strength and high in moldability, and are in wide use as materials for plastic moldings, in especial as matrix resins for fiber reinforced plastic moldings, which require minimized weight and high heat resistance, corrosion resistance and strength, or as back coat layers or gel coat layers of moldings composed of a gel coat layer and a back coat layer.

In this connection, unsaturated polyesters each having a dicyclopentenyl group have been known as resins which are good in compatibility with styrene and low in volatility of styrene, which styrene is contained in the resins as a vinyl monomer for crosslinking (hereinafter may simply referred to as a "crosslinking vinyl monomer"). In an air-contact surface of these unsaturated polyesters, namely a non-contact surface with a mold of these unsaturated polyesters applied in an open mold, curing proceeds fast because of air curing due to the dicyclopentenyl group, and the unsaturated polyesters are advantageously used as molding materials to be used in an open mold.

Cured articles of glass fiber reinforced unsaturated polyester resins are generally obtained by impregnating a glass fiber, a reinforcement, with an unsaturated polyester resin to form a laminate, and curing the resin. The cured articles are, however, hardly formed by a single step when they are wide in lamination area and large in thickness, e.g., 8 mm or more. In this case, the cured articles are generally obtained by, for example, a process comprising the steps of forming a first cured article about 3 to 5 mm thick beforehand, and forming a second cured article on the surface of the first cured article by wet lamination to give a molding composed of joined first and second cured articles, and repeating this procedure, or a process comprising the steps of molding a plurality of first cured articles beforehand, and joining these first cured articles with the use of a glass fiber reinforced unsaturated polyester resin, and curing the resin.

However, when an unsaturated polyester resin having a dicyclopentenyl group is used as a resinous molding material, and a second cured article is to be formed on the surface of a first cured article after the lapse of a certain time from the formation of the first cured article, the surface of the first cured article has been cured completely, and a laminated interface between the first and second cured articles becomes low in adhesiveness, which invites interfacial peeling of the laminate.

A possible solution to this peeling problem is to ensure secondary adhesiveness in laminate moldings or joint monolithic moldings using such unsaturated polyester resins each having a dicyclopentenyl group. For this purpose is employed a technique of forming a first cured article, and roughing the surface of a secondary adhesive surface of the first cured article by, for example, sanding to ensure secondary bond strength through anchoring effect.

Such additional processing as surface sanding, however, increases the number of process steps, which inhibits improvement in productivity. In addition, when the first cured article is a molding of a glass fiber reinforced plastic, the glass fiber is atomized in the sanding process and rises into air to deteriorate working atmosphere.

Accordingly, there is a strong felt need to provide unsaturated polyester resins which can ensure secondary adhesiveness without, for instance, sanding of the surface of a first cured article.

Separately, the use of methyl methacrylate or another polymerizable aliphatic vinyl monomer as part of crosslinking vinyl monomers is well known to improve the weather resistance of resultant moldings. Methyl methacrylate is, however, highly anaerobic (i.e., low in affinity to air) and its air-contact surface is cured very slowly. Accordingly, if a molding having a gel coat layer containing methyl methacrylate is obtained by forming the gel coat layer in an open mold, laminating a resinous molding composition on an air-contact surface of the gel coat layer, and curing the resin (hereinafter a layer formed by lamination may be referred to as "back coat layer"), it shows lifting and thus becomes defective. To be more specific, when an unsaturated polyester resin composition containing a polymerizable aliphatic vinyl monomer as part of crosslinking vinyl monomers is applied and cured to form a gel coat layer, and a resin composition for back coating is laminated onto the gel coat layer, a polymerizable vinyl monomer in the back coating resin composition migrates into the gel coat layer, which has been insufficiently cured, to swell the gel coat layer. The swelling of the gel coat layer invites creasing, crimps and uneven lifting of the gel coat layer itself and thus causes a defect, so-called lifting. A possible solution to this problem is to laminate a back coating resin composition after the gel coat layer is cured sufficiently. In this case, however, the productivity is deteriorated, and the adhesiveness between the gel coat layer and back coat layer is decreased due to the aforementioned deteriorated secondary adhesiveness.

The unsaturated polyester resins each having a dicyclopentenyl group are, as compared with unsaturated polyester resins having no dicyclopentenyl group, liable to exhibit yellowing due to long-term exposure to outdoor weathering and to be low in surface gloss. When they are used as moldings for outdoor applications, their weather resistance should essentially be improved. In particular, as unsaturated polyester resins obtained predominantly from styrene or another polymerizable aromatic vinyl monomer become further low in weather resistance, and demands for improvement in weather resistance have increased. In this connection, such polymerizable aromatic vinyl monomers are compounded for the purpose of ensuring the strength and heat resistance required for moldings.

SUMMARY OF THE INVENTION

The invention has been accomplished under these circumstances, and, accordingly, it is an object of the invention to provide an unsaturated polyester resin composition which can provide a laminated or joint monolithic molding having markedly high secondary bond strength without deteriorating inherent drying characteristics of the unsaturated polyester resin composition having a dicyclopentenyl group, and without using physical means or technique such as sanding, and to provide a molding produced by the use of the resin composition. An another object of the invention is to provide a molding having high weather resistance and a good finishing appearance, and an unsaturated polyester resin composition which can provide the aforementioned molding.

The invention provides, in an aspect, an unsaturated polyester resin composition comprising:

(A) 100 parts by weight of an unsaturated polyester having a dicyclopentenyl group;

(B) 20 to 100 parts by weight of a polymerizable aromatic vinyl monomer;

(C) 0.5 to 20 parts by weight of a polymerizable aliphatic vinyl monomer; and (D) 50 to 10000 ppm of a thermoplastic polymer based on the total weight of the components (A), (B) and (C), the thermoplastic polymer being soluble in the polymerizable aliphatic vinyl monomer, and the weight ratio (D/C) of the component (D) to the component (C) being equal to or less than $1/5$.

The term "dicyclopentenyl group" as used in the invention means and includes substituents represented by the following formulae (10) and (11).

(10)

(11)

A molded compound according to the invention is obtained by the use of the above inventive unsaturated polyester resin composition.

The invention provides, in another aspect, a process for the production of a molding, including the steps of: curing the aforementioned unsaturated polyester resin composition in an open mold to form a first cured article; and applying the unsaturated polyester resin composition onto an air-contact surface of the first cured article, and curing the applied resin to form a laminate.

In a further aspect, the invention provides a process for the production of a molding including the steps of: forming a gel coat layer in an open mold; and applying the aforementioned unsaturated polyester resin composition onto an air-contact surface of the gel coat layer, and curing the applied resin to form a back coat layer.

DESCRIPTION OF THE PREFERRED EMBODIMENTS

The inventive unsaturated polyester resin composition comprises, as essential components, an unsaturated polyester having a dicyclopentenyl group (hereinafter may simply be referred to as "component (A)"), a polymerizable aromatic vinyl monomer (hereinafter may simply be referred to as "component (B)"), a polymerizable aliphatic vinyl monomer (hereinafter may simply be referred to as "component (C)"), and a thermoplastic polymer soluble in the component (C) (hereinafter may simply be referred to as "thermoplastic polymer" or "component (D)"). Each of these essential components will be described below.

Unsaturated polyesters having a dicyclopentenyl group, the component (A), can be obtained according to a conventional method for the production of unsaturated polyesters by subjecting an unsaturated polybasic acid and a polyhydric alcohol to condensation polymerization. Such conventional methods include, but are not limited to, a method described in Technical Proceedings, 36th Annual Conference, Reinforced Plastics/Composites Institute, The Society of the Plastics Industry Inc., Session 7-E (1981). To be more specific, the aforementioned unsaturated polyesters are obtained by substituting part of an unsaturated polybasic acid component constituting unsaturated polyesters with an adduct of dicyclopentadiene with an unsaturated polybasic acid, or by substituting part of a polyhydric alcohol component constituting the unsaturated polyesters with an adduct of dicyclopentadiene with glycol or hydroxydicyclopentadiene. Alternatively, these unsaturated polyesters can be obtained by forming a compound having a dicyclopentenyl group by the addition of an acid component or a polyhydric alcohol component with dicyclopentadiene in the condensation polymerization of the acid component and the polyhydric alcohol component. In other words, the unsaturated polyesters can be obtained by subjecting an acid component and a polyhydric alcohol component to be used in the production of usual unsaturated polyesters to condensation polymerization in the presence of dicyclopentadiene, or by adding dicyclopentadiene to a reaction system after starting to condense and polymerize an acid component and a polyhydric alcohol component.

The acid value of the unsaturated polyester having a dicyclopentenyl group to be used in the invention is preferably, but is not limited to, equal to or less than 40. The number average molecular weight thereof is not limited, but is preferably in the range from 500 to 5000. The proportion of dicyclopentenyl group in the unsaturated polyester should preferably be equal to or more than 10% by weight. By this configuration, the unsaturated polyester is to have a higher affinity to polymerizable aromatic vinyl monomers, and the resultant unsaturated polyester resin obtained by blending the unsaturated polyester and polymerizable aromatic vinyl monomer can be a low-odor resin, i.e., a resin whose constitutive polymerizable aromatic vinyl monomer becomes less volatile in use.

Examples of unsaturated polybasic acids to constitute the component (A) include, but are not limited to, maleic acid, maleic anhydride, fumaric acid, itaconic acid, citraconic acid, and esters of these compounds. Each of these compounds can be used singly or in combination.

Adducts of dicyclopentadiene with unsaturated polybasic acids include adducts obtained by adding any of the aforementioned polybasic acids to dicyclopentadiene, such as an adduct of dicyclopentadiene with maleic acid, and an adduct of dicyclopentadiene with maleic half ester. Of these compounds, adducts of dicyclopentadiene with unsaturated divalent carboxylic acids are preferred, among which an adduct of dicyclopentadiene with maleic acid is typically preferred. The adduct of dicyclopentadiene with maleic acid can be obtained by addition reaction of dicyclopentadiene with maleic anhydride in the presence of water.

As polybasic acids to constitute the component (A), saturated polybasic acids can be used, in addition to the unsaturated polybasic acids, within the range not deteriorating the mechanical characteristics and heat resistance. Such saturated polybasic acids to be used include, but are not limited to, oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, and other saturated aliphatic polybasic acids; phthalic acid, isophthalic acid, terephthalic acid, trimellitic acid, pyromellitic acid, and other aromatic polybasic acids; chlorendic acid, 1,2-hexahydrophthalic acid, 1,2-hexahydrophthalic anhydride, methylhexahydrophthalic anhydride, 1,1-cyclobutanedicarboxylic acid, 1,2-cyclohexanedicarboxylic acid, 1,3-cyclohexanedicarboxylic acid, trans-1,4-cyclohexanedicarboxylic acid, and other saturated alicyclic polybasic acids; acid anhydrides of these compounds; halides of these compounds; and ester derivatives of these compounds. Of these compounds, hexahydrophthalic anhydride, methylhexahydrophthalic anhydride, 1,2-cyclohexanedicarboxylic acid, 1,3-cyclohexanedicarboxylic acid, 1,4-cyclohexanedicarboxylic acid or an ester of these compound is preferably used as part of the polybasic acids constituting the unsaturated polyester.

Polyhydric alcohols to constitute the component (A) include, but are not limited to, ethylene glycol, diethylene glycol, 1,3-propanediol, 2-methyl-1,3-propanediol, 1,4-butanediol, 1,3-butanediol, 2,3-butanediol, dipropylene glycol, 1,5-pentanediol, 1,6-hexanediol, 2,2-dimethyl-1,3-propanediol (neopentyl glycol), 2-ethyl-1,4-butanediol, 1,7-heptanediol, 1,8-octanediol, 1,9-nonanediol, 1,10-decanediol, 1,4-cyclohexanediol, 1,4-dimethylolcyclohexane, 2,2-diethyl-1,3-propanediol, 3-methyl-1,4-pentanediol, 2,2-diethyl-1,3-butanediol, 4,5-nonanediol, triethylene glycol, tetraethylene glycol, and other dihydric alcohols; glycerin, trimethylolpropane, and other trihydric alcohols; pentaerythritol, dipentaerythritol, and other tetrahydric or higher polyhydric alcohols; hydrogenated bisphenol A, adducts of hydrogenated bisphenol A with alkylene oxides, and ethylene glycol carbonate. Each of these compounds can be used independently or in combination.

The component (B), polymerizable aromatic vinyl monomer, is used as a vinyl monomer for crosslinking the component (A), unsaturated polyester, to give moldings having excellent mechanical characteristics and heat resistance. Such polymerizable aromatic vinyl monomers are less volatile than polymerizable aliphatic vinyl monomers, and are suitable as vinyl monomers for crosslinking unsaturated polyester resins for open mold applications.

The polymerizable aromatic vinyl monomers to be used in the inventive resin composition include, but are not limited to, styrene, α-methylstyrene, chlorostyrene, dichlorostyrene, divinylbenzene, t-butylstyrene, and vinyltoluene. Each of these monomers may be used singly or in combination.

The proportion of the polymerizable aromatic vinyl monomer should fall in the range from 20 to 100 parts by weight, preferably from 40 to 80 parts by weight per 100 parts by weight of the unsaturated polyester. If the proportion is less than 20 parts by weight, the mechanical characteristics and heat resistance of obtained moldings are deteriorated. If it exceeds 100 parts by weight, the proportion of the component (C), polymerizable aliphatic vinyl monomer, should be reduced because the total amount of the monomers should be within a predetermined range to inhibit shrinkage of cured articles due to crosslinking. The use of the component (C) in an excessively small amount fails to stabilize the component (D), as described later.

The component (C), polymerizable aliphatic vinyl monomer, is added not only as a vinyl monomer for crosslinking the unsaturated polyester, the component (A), but also for stabilizing the component (D). To be more specific, as the component (B) has high affinity to the unsaturated polyester, the component (C) should be in coexistence in the resin to stabilize the component (D). In addition, the component (C) has high affinity to glass fiber, a reinforcement, and the addition of component (C) improves impregnation property with respect to a glass fiber mat or another reinforcement.

As the component (C) to be used in the invention, there may be mentioned vinyl acetate, methyl (meth)acrylate, ethyl (meth)acrylate, butyl (meth)acrylate, isopropyl (meth) acrylate, 2-ethylhexyl (meth)acrylate, and methoxyethyl (meth)acrylate. Each of these compounds can be used independently or in combination. To impart high weather resistance to the molding, (meth)acrylates are preferred, of which methyl methacrylate is typically preferred.

The content of the component (C) should fall in the range from 0.5 to 20 parts by weight, preferably from 3 to 10 parts by weight per 100 parts by weight of the component (A). For the purpose of stabilizing the component (D), the aforementioned content is sufficient. On the contrary, if the content is excessively large, the total content of the crosslinking vinyl monomers increases excessively, resulting in increased shrinkage of the cured articles or increased volatilization of the component (C).

The component (D), thermoplastic polymer, becomes a thin film on the air-contact surface of the first cured article during its formation. By this configuration, curing due to auto-oxidation of dicyclopentenyl groups on the air-contact surface is prevented. In addition, the polymerizable aliphatic vinyl monomer which is liable to evaporate and thereby to cause odor is sealed and therefore serves effectively in crosslinking reaction, and volatilization of the polymerizable aromatic vinyl monomer is also prevented. When a resin composition for second cured article or a resin composition for bonding with another cured article (hereinafter the both may be referred to as "resin composition for second cured article or the like") is laminated after the formation of the first cured article, a polymerizable vinyl monomer in the resin composition for second cured article or the like dissolves the thermoplastic polymer on the surface of the first cured article to ensure satisfactory secondary adhesiveness with the first cured article.

The component (D) includes, but is not limited to, poly (methyl (meth)acrylate), poly(ethyl (meth)acrylate), methyl methacrylate/methyl acrylate copolymer, styrene/methyl methacrylate copolymer, and other homopolymers or copolymers of polymerizable vinyl monomers to be used in the resin composition. Of these polymers, poly(methyl methacrylate) (PMMA) is advantageously used, because it is soluble in the polymerizable aromatic vinyl monomer, as well as in the polymerizable aliphatic vinyl monomer, and therefore provides higher uniformity of the resin composition.

The proportion of the component (D) should fall in the range from 50 to 10000 ppm, preferably from 200 to 8000 ppm, and more preferably from 3000 to 8000 ppm based on the total weight (A+B+C) of the components (A), (B) and (C). If the proportion is less than 50 ppm, a sufficient thin film to cover the air-contact surface of the first cured article is not formed, resulting in insufficient prevention of volatilization of the component (C) and insufficient oxygen barrier. On the contrary, if it exceeds 10000 ppm (corresponding to 1% by weight based on the total weight of the components (A), (B) and (C)), the bond strength between the first cured article and the second cured article laminated thereon, i.e. secondary adhesiveness, is deteriorated. The weight ratio (D/C) of the component (D) to the component (C) should be equal to or less than ⅕. By compounding the both components in a ratio within the above range, the component (D) can be stabilized and exist uniformly in the resin composition, which prevents changes in properties or deterioration of advantages of the component (D) even if stored for a long time.

The component (D) may be an ultraviolet-absorbing thermoplastic polymer having an ultraviolet-absorbing monomeric unit represented by the following formula (1). The monomeric unit can be obtained by the polymerization of a monomer composition containing an ultraviolet-absorbing monomer represented by the following formula (1').

(1)

(1')

wherein $R^1$ is a hydrogen atom or a hydrocarbon group having 1 to 8 carbon atoms, $R^2$ is a linear- or branched-chain alkylene group having 1 to 6 carbon atoms, $R^3$ is a hydrogen atom or a methyl group, and X is a hydrogen atom, a halogen atom, a hydrocarbon group having 1 to 8 carbon atoms, an alkoxy group having 1 to 4 carbon atoms, a cyano group or a nitro group.

The ultraviolet-absorbing monomer represented by the formula (1') [hereinafter simply referred to as "ultraviolet-absorbing monomer (1')"] is a benzotriazole compound.

Practical examples of the ultraviolet-absorbing monomer (1) include, but are not limited to, 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2-[2'-hydroxy-5'-(methacryloyloxyhexyl)phenyl]-2H-benzotriazole, 2-[2'-hydroxy-3'-t-butyl-5'-(methacryloyloxyethyl)phenyl]-2H-benzotriazole, 2-[2'-hydroxy-5'-t-butyl-3'-(methacryloyloxyethyl)phenyl]-2H-benzotriazole, 2-[2'-hydroxy-5'-(methacryloyloxyethyl)phenyl]-5-chloro-2H-benzotriazole, 2-[2'-hydroxy-5'-(methacryloyloxyethyl)phenyl]-5-methoxy-2H-benzotriazole, 2-[2'-hydroxy-5'-(methacryloyloxyethyl)phenyl]-5-cyano-2H-benzotriazole, 2-[2'-hydroxy-5'-(methacryloyloxyethyl)phenyl]-5-t-butyl-2H-benzotriazole, and 2-[2'-hydroxy-5'-(methacryloyloxyethyl)phenyl]-5-nitro-2H-benzotriazole. Each of these ultraviolet-absorbing monomers (1) can be used singly or in combination as an adequate mixture.

The ultraviolet-absorbing thermoplastic polymer may further comprise a monomeric unit represented by the following formula (2).

(2)

wherein $R^{10}$ is a hydrogen atom or a hydrocarbon group having 1 or 2 carbon atoms, and Z is a cycloalkyl group which may have a substituent.

The ultraviolet-absorbing polymer having a monomeric unit of the formula (2) can be obtained by copolymerization of a monomer composition containing a monomer represented by the following formula (2') (hereinafter simply referred to as "cycloalkyl group-containing monomer (2')") in addition to the ultraviolet-absorbing monomer (1).

(2')

wherein $R^{10}$ is a hydrogen atom or a hydrocarbon group having 1 or 2 carbon atoms, and Z is a cycloalkyl group which may have a substituent.

The substituent Z (i.e. cycloalkyl group) includes, but is not limited to, cyclopentyl group, cyclohexyl group, cyclododecyl group, and other saturated monocyclic hydrocarbon groups. These cycloalkyl groups may each have an alkyl group having 1 to 7 carbon atoms as a substituent. Practical examples of these alkyl groups include, but are not limited to, methyl group, ethyl group, propyl group, isopropyl group, butyl group, isobutyl group, t-butyl group, pentyl group, and hexyl group. As concrete examples of the cycloalkyl group-containing monomers (2') include cyclohexyl (meth)acrylate, methylcyclohexyl (meth)acrylate, t-butylcyclohexyl (meth)acrylate, and cyclododecyl (meth)acrylate. Each of these monomers can be used independently or in combination.

The ultraviolet-absorbing thermoplastic polymer may further comprise a monomeric unit represented by the following formula (3) (hereinafter referred to as "ultraviolet-stable monomer (3)") or a monomeric unit represented by the following formula (4) (hereinafter referred to as "ultraviolet-stable monomer (4)"), or both.

(3)

wherein $R^6$ is a hydrogen atom or a cyano group, each of $R^7$ and $R^8$ is independently a hydrogen atom or a hydrocarbon group having 1 or 2 carbon atoms, $R^9$ is a hydrogen atom or a hydrocarbon group having 1 to 18 carbon atoms, and Y is an oxygen atom or an imino group.

(4)

wherein $R^6$ is a hydrogen atom or a cyano group, each of $R^7$ and $R^8$ is independently a hydrogen atom or a hydrocarbon group having 1 or 2 carbon atoms, and Y is an oxygen atom or an imino group.

The ultraviolet-absorbing polymer may further comprise another monomeric unit in addition to monomeric units derived from the above monomers (the ultraviolet-absorbing monomer (1), cycloalkyl group-containing monomer (2), ultraviolet-stable monomer (3) and ultraviolet-stable monomer (4)). That is, the monomer composition for the production of the ultraviolet-absorbing polymer may comprise an additional monomer (hereinafter simply referred to as "monomer (a)") within the range not deteriorating physical properties of the ultraviolet-absorbing polymer.

Practical examples of the "monomer (a)" include, but are not limited to, methyl (meth)acrylate, ethyl (meth)acrylate, propyl (meth)acrylate, isopropyl (meth)acrylate, butyl (meth)acrylate, isobutyl (meth)acrylate, t-butyl (meth) acrylate, 2-ethylhexyl (meth)acrylate, lauryl (meth)acrylate, stearyl (meth)acrylate, and other alkyl (meth)acrylates; glycidyl (meth)acrylate, and other unsaturated epoxy-group-containing monomers; (meth)acrylamide, N,N'-dimethylaminoethyl (meth)acrylate, vinylpyridine, vinylimidazole, and other unsaturated nitrogen-containing monomers; vinyl chloride, vinylidene chloride, and other unsaturated halogen-containing monomers; styrene, α-methylstyrene, vinyltoluene and other unsaturated aromatic monomers; vinyl acetate, and other vinyl esters; vinyl ethers; (meth)acrylonitrile, and other unsaturated cyanides; hydroxyethyl (meth)acrylate, caprolactone-modified hydroxyalkyl (meth)acrylate (e.g., trade name: PLACCEL FM, a product of Daicel Chemical Industries, Ltd., Japan), mono(meth)acrylates of polyesterdiols obtained from phthalic acid and propylene glycol, and other unsaturated hydroxy-group-containing monomers. Each of these monomers can be used independently or in combination.

The proportions of the individual monomers in the ultraviolet-absorbing polymer are not limited. Preferably, the content of the ultraviolet-absorbing monomer (1) should fall in the range from 0.1% to 30% by weight, more preferably from 1% to 20% by weight, and particularly from 2% to 15% by weight, and the content of the cycloalkyl group-containing monomer (2) should preferably fall in the range from 2% to 95% by weight, more preferably from 5% to 85% by weight, and especially from 10% to 75% by weight based on the total weight of the ultraviolet-absorbing polymer. If the content of the ultraviolet-absorbing monomer (1) is less than 1% by weight, sufficient ultraviolet-absorbing property is not obtained. On the contrary, if it exceeds 30% by weight, gloss and finishing appearance are deteriorated, and hence the resultant composition is not suitable as a gel coat composition; and chemical resistance and solvent resistance may be deteriorated, which deteriorates these properties of the resulting cured article of a curable resin and gel coat layer. If the proportion of the cycloalkyl group-containing monomer (2) is less than 2% by weight, sufficient weather resistance, gloss, hardness and other performances are not obtained, which causes insufficient improvement in weather resistance, and deteriorated hardness and gloss of the resultant molding of a cured resin, and of the gel coat layer. On the contrary, if it exceeds 95% by weight, the ultraviolet-absorbing polymer is low in flexibility and the resultant molding and gel coat layer become brittle.

When the ultraviolet-absorbing polymer contains the ultraviolet-stable monomer (3) and/or the ultraviolet-stable monomer (4), the total amount of both monomers should preferably fall in the range from 0.1% to 15% by weight, more preferably from 0.5% to 10% by weight, and especially from 1% to 5% by weight based on the total weight of the ultraviolet-absorbing polymer. Add to this, the proportion of the ultraviolet-stable monomer (4) should preferably be equal to or less than 1% by weight. When the total amount of the ultraviolet-stable monomers (3) and (4) is set to within the above range, the ultraviolet-absorbing property of the ultraviolet-absorbing polymer can be retained for a long time. If the content of the ultraviolet-absorbing monomer (4) exceeds 1% by weight, the thermoplasticity of the ultraviolet-absorbing polymer is deteriorated.

The inventive resin composition may further comprise additives in addition to the essential components (A), (B), (C) and (D), where necessary. Such additives include, but are not limited to, methylhydroquinone, hydroquinone, and other polymerization inhibitors to improve storage stability; finely powdery silicic anhydride, asbestine, and other thixotropy-imparting agents; antioxidants; mold lubricants; polymerization catalysts; polymerization promoters; pigments; calcium carbonate, clay, talc, silica sand, glass powder, and other fillers; iron compounds, alkali metals, alkaline earth metals, and other stabilizers; paraffin, wax, and other volatilization-inhibitors. In this connection, the polymerization catalysts are added immediately before use.

The inventive resin composition having the aforementioned composition is excellent in secondary adhesiveness without deteriorating drying characteristics of the air-contact surface. It exhibits less volatilization of constitutive monomers and is suitable as a molding material for open mold applications. The resin composition is high in affinity to reinforcing glass fibers can satisfactorily be impregnated to, for example, glass fiber mats, and therefore is excellent as a matrix resin for glass fiber reinforced plastics. When the ultraviolet-absorbing thermoplastic polymer is used as the component (D), the stability against ultraviolet ray of the resultant molding can be improved.

The molding according to the invention is a molding produced by the use of the inventive unsaturated polyester resin composition. As the inventive unsaturated polyester resin composition is satisfactory in impregnation property to a glass fiber, and its use as a matrix resin for fiber reinforced plastics can give a molding which is applicable for applications requiring high mechanical strength. Furthermore, when the unsaturated polyester resin composition comprises the ultraviolet-absorbing thermoplastic polymer containing the ultraviolet-absorbing monomeric unit as the component (D), a molding having satisfactory weather resistance can be obtained even though an unsaturated polyester having a dicyclopentenyl group is predominantly employed. In other words, for moldings requiring weather resistance such as those for outdoor use, the unsaturated polyester resin composition containing the ultraviolet-absorbing thermoplastic polymer having the ultraviolet-absorbing monomeric unit is preferably used.

The inventive moldings include not only moldings corresponding to first cured articles which are obtained by applying the inventive unsaturated polyester resin composition to a mold and curing, but also laminates obtained by laminating a plurality of cured articles of the inventive unsaturated polyester resin composition, and joint monolithic moldings obtained by jointing a plurality of parts separately molded using the inventive resin composition. In addition, the moldings also fall in the scope of the invention that are composed of a molding (including a laminate) of the inventive unsaturated polyester resin composition as a back coat layer, and a gel coat layer covering the surface of the back coat layer. As the gel coat layer, preferably is a cured article of an unsaturated polyester resin composition described below. The unsaturated polyester resin composition is referred to as "gel coating unsaturated polyester resin composition" to distinguish from the inventive unsaturated polyester resin composition. Moldings comprising a gel coat layer composed of the other resin than the gel coating unsaturated polyester resins are also in the scope of the invention.

Referring to the gel coating unsaturated polyester resin compositions, are preferred unsaturated polyester resin compositions containing a thermoplastic polymer in a proportion of 20 to 10000 ppm based on the weight of an unsaturated polyester resin (a mixture of an unsaturated polyester and a crosslinking vinyl monomer). The viscosity of the gel coating unsaturated polyester resin composition should be adjusted within the range from about 1000 to about 10000 mPa.s to avoid sags in the application step.

The unsaturated polyester, a main component of the gel coating unsaturated polyester resin composition, is not limited, but preferably has an acid value of about 9 to 35, and a number average molecular weight of about 1500 to 5000.

Preferred polymerizable crosslinking vinyl monomers to be contained in the gel coating unsaturated polyester resin composition include, but are not limited to, mixtures of an aromatic vinyl monomer and an aliphatic vinyl monomer. As such aromatic vinyl monomers and aliphatic vinyl monomers, use can be made of those exemplified as the components (B) and (C) of the inventive unsaturated polyester resin composition. In this connection, the proportions of these monomers should preferably fall in the following ranges.

The proportion of the polymerizable aromatic vinyl monomer should preferably fall in the range from 30 to 100 parts by weight per 100 parts by weight of the unsaturated polyester. If the proportion is less than 30 parts by weight, sufficient mechanical strength, heat resistance, and hot water resistance of the resultant gel coat layer are not obtained. On the contrary, if it exceeds 100 parts by weight, shrinkage due to crosslinking is increased, or the content of the polymerizable aliphatic vinyl monomer must be decreased to retain the total amount of crosslinking vinyl monomers and to avoid shrinkage due to crosslinking, resulting in deteriorated weather resistance because of decreased proportion of the polymerizable aliphatic vinyl monomer.

To impart sufficient weather resistance to the gel coat layer, the content of the polymerizable aliphatic vinyl monomer should preferably fall in the range from 7 to 100 parts by weight per 100 parts by weight of the unsaturated polyester. If the content is less than 7 parts by weight, sufficient weather resistance is not obtained. On the contrary, if it exceeds 100 parts by weight, the content of the other crosslinking vinyl monomer (the polymerizable aromatic vinyl monomer) must relatively be decreased to avoid shrinkage due to crosslinking, and sufficient mechanical strength, heat resistance and hot water resistance of the gel coat layer are not obtained.

The thermoplastic polymer, an essential component of the gel coating unsaturated polyester resin composition, is compounded to suppress the volatilization of the crosslinking vinyl monomers. To be more specific, it is compounded to solve the odor problem in an open mold and to block the contact of the unsaturated polyester resin composition with air during curing. It is supposed that the thermoplastic polymer gives a very thin film on the air-contact surface, i.e., the surface where the molding resin composition is to be laminated, of the gel coat layer when the gel coat layer is formed. Accordingly, it encapsulates the crosslinking vinyl monomers in the gel coat layer in mid course of curing to avoid the volatilization of the polymerizable aliphatic vinyl monomer which would cause odor, and to block the monomer from air (especially oxygen), and thereby to prevent the delay of cure reaction of the gel coating resin composition, especially of polymerization reaction in which the anaerobic polymerizable aliphatic vinyl monomer is involved. By preventing the volatilization of the crosslinking vinyl monomers, the inherent excellent mechanical strength, heat resistance, hot water resistance of the unsaturated polyester resin can be ensured. In addition, by preventing the delay of cure reaction of the gel coat layer, swelling of the gel coat layer due to migration of crosslinking vinyl monomers in the inventive unsaturated polyester resin composition, which is used to form the back coat layer, can be prevented, resulting in prevention of lifting of the gel coat layer. Furthermore, the very thin film of the thermoplastic polymer on the surface where the gel coat layer is to be laminated can ensure the adhesiveness of the gel coat layer with the back coat layer each having different composition and viscosity.

As the thermoplastic polymer just mentioned above, those exemplified as the component (D) of the inventive unsaturated polyester resin composition can be employed. Preferably, the ultraviolet-absorbing thermoplastic polymer having an ultraviolet-absorbing monomeric unit of the formula (1), as described in regard to the component (D), is used to improve the weather resistance of the gel coat layer.

The proportion of the thermoplastic polymer in the gel coating unsaturated polyester resin composition should preferably fall in the range from 20 to 10000 ppm, and more preferably from 400 to 4000 ppm based on the total weight of the unsaturated polyester resin (corresponding to the total weight of the unsaturated polyester and crosslinking vinyl monomers). If the proportion is less than 20 ppm, a thin film covering the surface of the gel coat layer is not formed sufficiently, resulting in insufficient prevention of the volatilization of the crosslinking vinyl monomers (especially, aliphatic vinyl monomer) and insufficient blocking of oxygen. To the contrary, if it exceeds 10000 ppm (corresponding to 1% by weight of the unsaturated polyester resin), the bond strength between the back coat layer and the gel coat layer is reduced. When an aliphatic vinyl monomer is compounded as a crosslinking vinyl monomer, the weight ratio (thermoplastic polymer/aliphatic vinyl monomer) of the thermoplastic polymer to the aliphatic vinyl monomer is preferably equal to or less than $1/5$. Within this range, the thermoplastic polymer is stabilized and is uniformly dispersed in the gel coating unsaturated polyester resin composition, and therefore the gel coating resin composition does not change in properties and the advantages of the use of the thermoplastic polymer are not reduced even if the resin composition is stored for a long time.

The gel coating unsaturated polyester resin composition may further comprise, where necessary, 0.1 to 70 parts by weight of a pigment, in addition to the essential components, the unsaturated polyester resin and thermoplastic polymer. The resin composition may further comprise various additives such as hydroquinone, and other polymerization inhibitors to improve stability in preservation; finely powdery silicic anhydride, asbestine, and other thixotropy-imparting agents; antioxidants; mold lubricants; polymerization catalysts; polymerization promoters; pigments; calcium carbonate, clay, talc, silica sand, glass powder, and other fillers; iron compounds, alkali metals, alkaline earth metals, and other stabilizers; paraffin, wax, and other volatilization-inhibitors. In this connection, the polymerization catalysts are generally added immediately before use.

The processes for the production of the inventive molding will now be described in detail.

The inventive production process according to a first embodiment (hereinafter referred to as the first production process) is suitable for the production of a molded laminate obtained by laminating a plurality of cured articles of the inventive unsaturated polyester resin composition. To be more specific, the process comprises the steps of: curing the inventive unsaturated polyester resin composition in an open mold to form a first cured article; and applying another portion of the inventive unsaturated polyester resin composition onto an air-contact surface of the first cured article, and curing the applied resin to form a laminate. As such open mold techniques, there are a variety of conventional known techniques such as a hand lay-up technique and spray-up technique.

The first production process includes, within its scope, a process for the production of a molded laminate comprising the steps of repeating application and curing of the unsaturated polyester resin composition in an open mold, as well as a process comprising the steps of curing the inventive unsaturated polyester resin composition in advance to form two cured articles separately, applying another portion of the inventive unsaturated polyester resin composition so as to be sandwiched between the two cured articles, and jointing and integrating the both articles by curing.

As the inventive unsaturated polyester resin composition is excellent in secondary adhesiveness, according to either of the above two processes, molded laminates of the unsaturated polyester resin having satisfactory secondary adhesiveness can be obtained without an additional process such as roughing of a secondary adhesive surface 2 of a first cured article 1 as in conventional processes. In addition, the inventive unsaturated polyester resin composition is satisfactory in impregnation property into a glass fiber, and fiber reinforced plastic moldings can be prepared by the use of the production process even though the resin composition is cured fast.

Figure 1A:
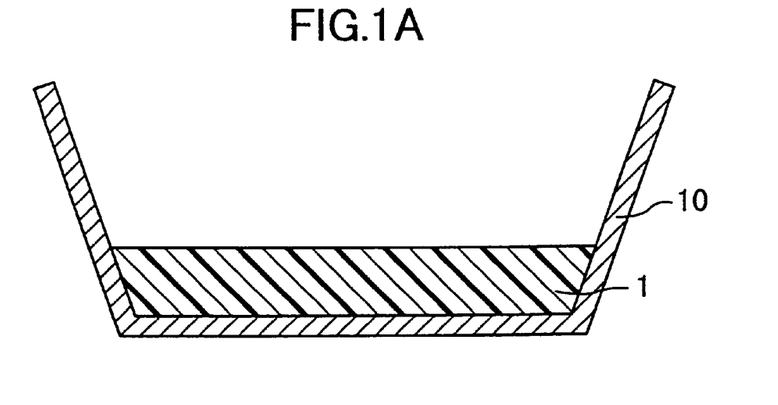
FIGS. 1A to 1C are illustrations of an embodiment of the process for the production of the inventive molding.
Figure 1B:
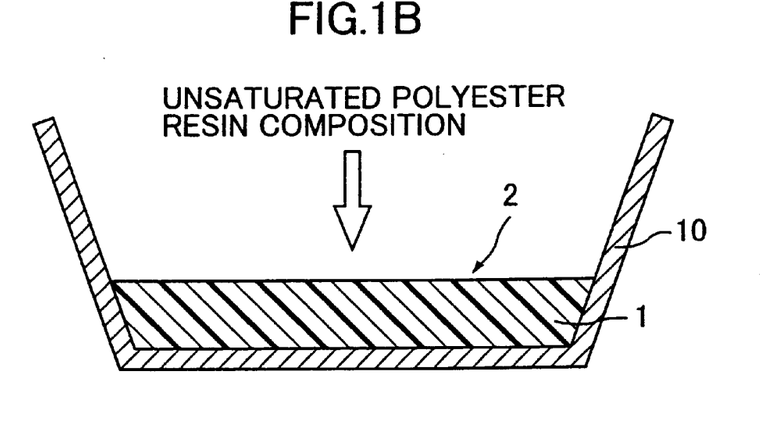
Figure 1C:
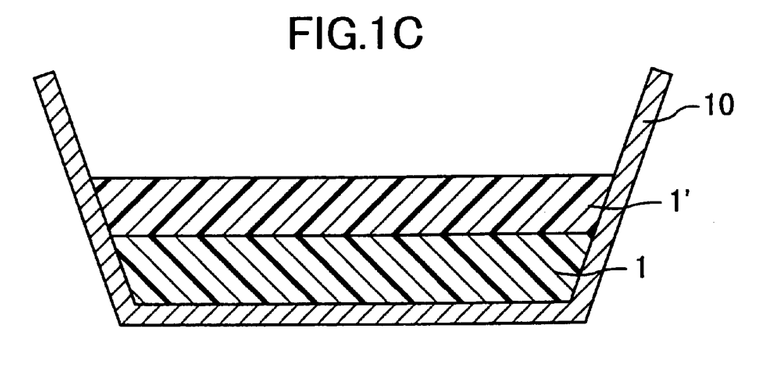
Figure 2A:
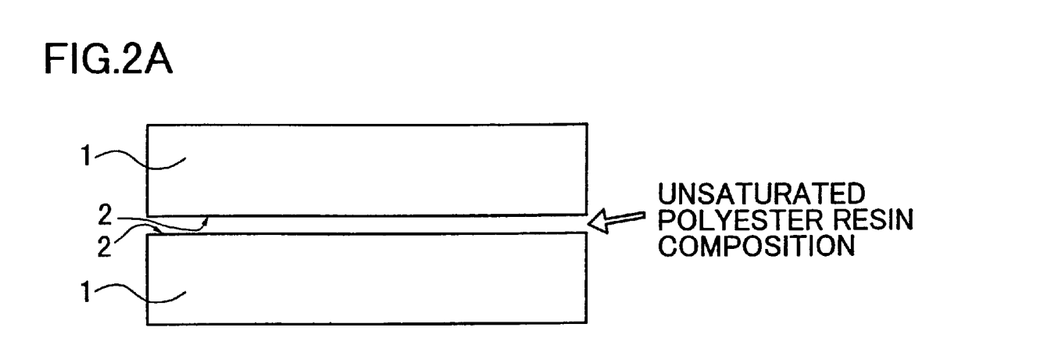
FIGS. 2A and 2B are illustrations of another embodiment of the process for the production of the inventive molding.
Figure 2B:
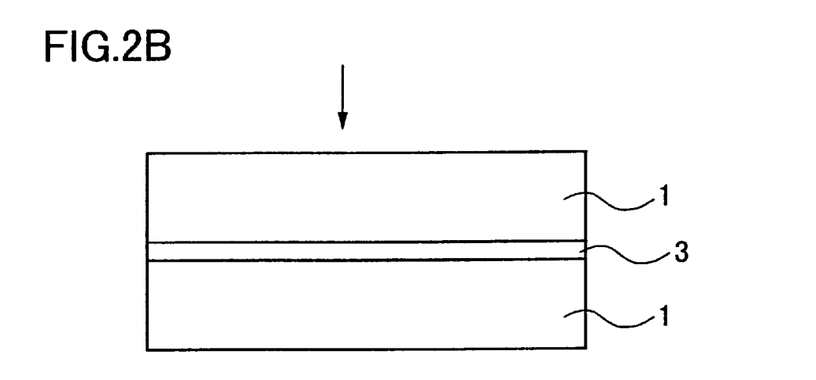
Figure 3A:
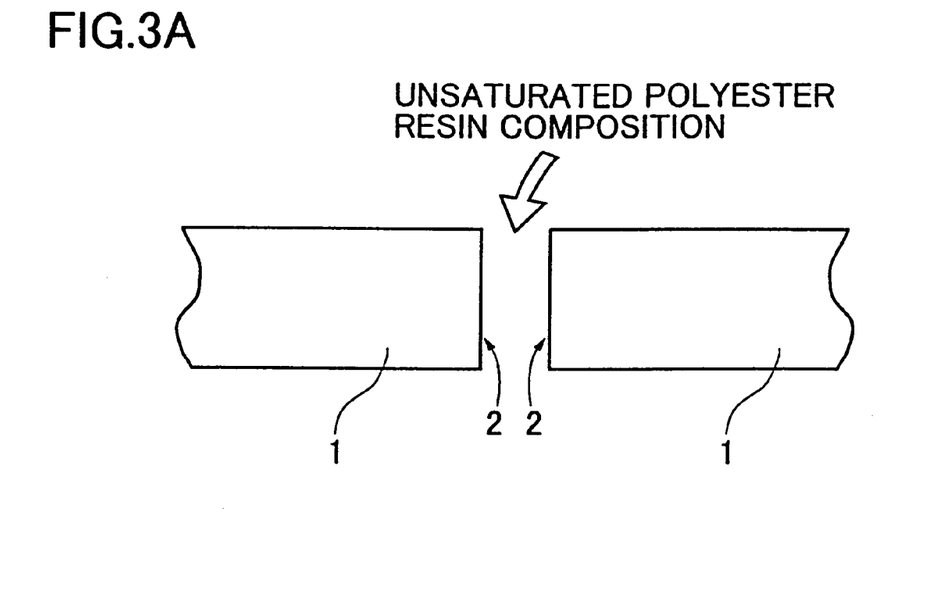
FIGS. 3A and 3B are illustrations of a further embodiment of the process for the production of the inventive molding.
Figure 3B:
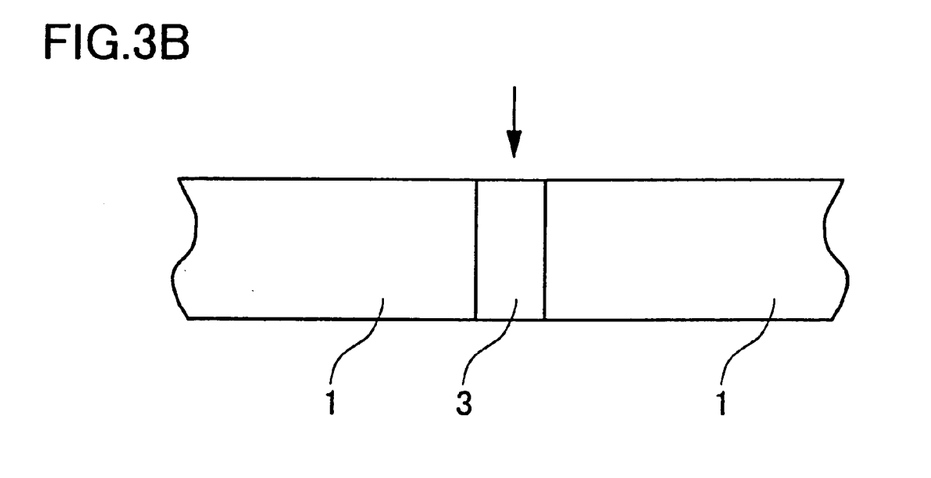

For example, a glass fiber (such as a glass mat or a glass roving cloth) as a reinforcement is laid in an open mold 3, and the glass fiber is impregnated with the inventive unsaturated polyester resin composition, and the resin composition is cured to form a desired number of plies of a first cured article 1 of the glass fiber reinforced unsaturated polyester resin composition (FIG. 1A). A secondary adhesive surface 2 corresponding to the air-contact surface of the first cured article 1 is impregnated and coated with the inventive unsaturated polyester resin composition in a similar manner (FIG. 1B). The applied unsaturated polyester resin is then cured to form a second cured article 1' and thereby to give a molded laminate (fiber reinforced plastic molding) of the inventive unsaturated polyester resin composition (FIG. 1C).

Alternatively, molded laminates can be prepared in the following manner: Two first cured articles 1, 1 of the inventive unsaturated polyester resin composition are prepared separately, a reinforcing fiber such as a glass mat impregnated with the unsaturated polyester resin composition is interposed between the two first cured articles, and the resin is cured as sandwiched between the first cured articles 1 and 1 under pressure, as shown in FIGS. 2A, 2B, 3A and 3B.

Another inventive production process according to a second embodiment (hereinafter referred to as "second production process") is a process for the production of a molding composed of a gel coat layer and a back coat layer, and is suitable for the production of a molding in which its back coat layer is a cured article of the inventive unsaturated polyester resin composition. To be more specific, the second production process includes the steps of: forming a gel coat layer in an open mold; and applying the inventive unsaturated polyester resin composition onto an air-contact surface of the gel coat layer, and curing the applied resin to form a back coat layer.

The inventive unsaturated polyester resin composition is, owing to the component (D) (thermoplastic polymer), excellent in adhesiveness with respect to another resin, and exhibits less volatilization of constitutive monomers, and can provide, by an open mold technique, moldings satisfactory in adhesiveness between the gel coat layer and the back coat layer. In especial, the use of the gel coating unsaturated polyester resin composition, as mentioned in regard to the inventive molding, as the gel coat layer can provide moldings having higher bond strength between the gel coat layer and the back coat layer.

To produce a fiber reinforced plastic molding according to the second production process, an nonwoven fabric, a roving cloth, a roving, short fiber or the like composed of a reinforcing fiber such as a glass fiber is laid on the formed gel coat layer, and the reinforcing fiber is impregnated with the inventive unsaturated polyester resin composition, and the resin composition is cured. Separately, by repeating a step for the formation of the back coat layer, moldings whose back coat layer is a molded laminate of the inventive unsaturated polyester resin composition can be obtained.

The invention will be further illustrated in detail with reference to several inventive examples and comparative examples below which are not directed to limiting the scope of the invention. In the following examples, percent (%) and parts appearing after each numerical figure are by weight unless otherwise specified.

The inventive molding obtained from the inventive unsaturated polyester resin composition can be molded in open molds, and is high in productivity because of its rapid dry hard. In addition, large-sized or thick moldings, which are produced as molded laminates or joint monolithic articles, can be produced with efficiency without the use of conventional cumbersome tasks such as surface roughing. The moldings thus obtained have high adhesion strength and high integrity.

The unsaturated polyester resin composition contains an ultraviolet-absorbing thermoplastic polymer as the thermoplastic polymer, component (D), is excellent in weather resistance, and the resultant molding having a gel coat layer obtained by the use of the aforementioned resin composition is also suitable for outdoor applications.

EXAMPLES

Evaluation Methods (i) Secondary Adhesiveness

Figures 4A, 4B:
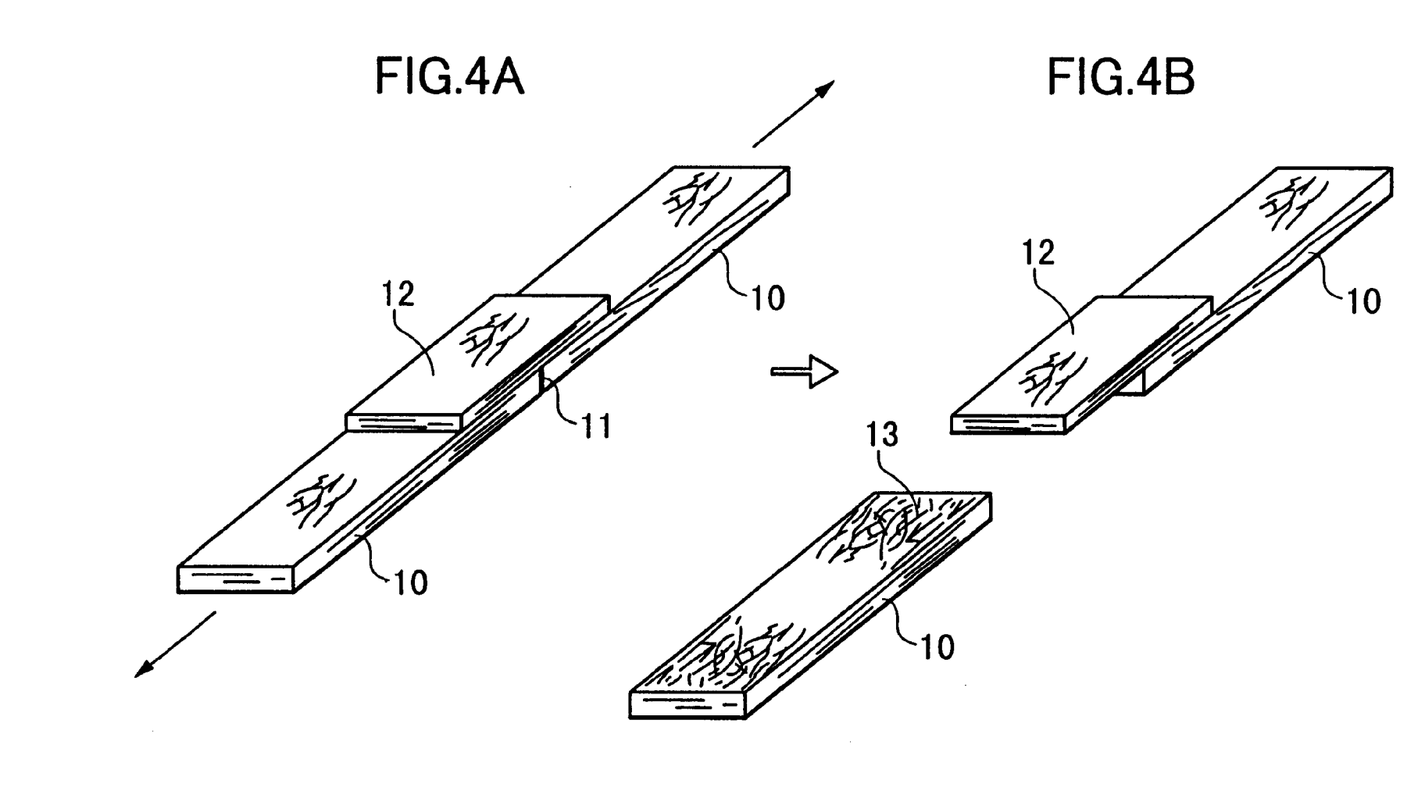
FIGS. 4A and 4B are illustrations of an evaluation method of the secondary adhesiveness.

The secondary adhesiveness was evaluated with the use of a test piece as shown in FIG. 4A. The test piece was prepared in the following manner: Five plies of a glass fiber mat (trade name: CM455FA; Asahi Fiber Co., Ltd., Japan) were impregnated with a resin composition, and the resin was cured, and the obtained article was then exposed outdoors to sunshine at 30° C. to 37° C. for 100 hours to form a first cured article. The first cured article was cut into two pieces, first cured pieces 10, 10. The first cured pieces 10, 10 were then adhered with each other on their cut surfaces, and on top of the first cured pieces 10, 10, three plies of the glass fiber mat 50 mm wide were laid, and the glass fiber mat was impregnated with another portion of the same resin composition with that of the first cured article, dried and cured to form a second cured article 12. The obtained test piece was allowed to stand for one day, and then was subjected to after cure at 100° C. for 2 hours before measurement.

Using the prepared test piece, the both edges of the two first cured pieces 10,10 were held and pulled in the opposite directions (in the directions indicated by solid arrows in FIG. 4A), and a tensile strength (kN) at breaking was measured and the broken surface (joint surface between the second cured article 12 and the first cured article 10) was visually inspected, and the secondary adhesiveness was rated as "poor" when the broken surface showed interfacial peeling, and was rated as "good" when the adherend first cured piece 10 showed adherend failure.

(ii) Odor

The odor was rated by measuring the concentration of volatilized monomers with a gas indicator tube during a time period (gelation time) from immediately after the application of the resin composition until the formation of the cured article.

The higher the measured value was, the more monomers were volatilized before gelation and the worse the odor was.

(iii) Cure Property

The cure property was evaluated by the set to touch of a cured article 65 minutes after the completion of application step of the resin composition. It was rated as "good" if the surface of the cured article was set to touch, and it was rated as "poor" when the surface was sticky.

(iv) Lifting

A test piece was obtained by forming a gel coat layer, laminating a molding resin composition on the gel coat layer, and curing the resin composition to give a molding. The surface of the molding where the gel coat layer was laminated (design surface of the molding) was visually inspected, and the lifting was evaluated according to the following criteria:

O: No lifting or crimp on the design surface

Figure 5:
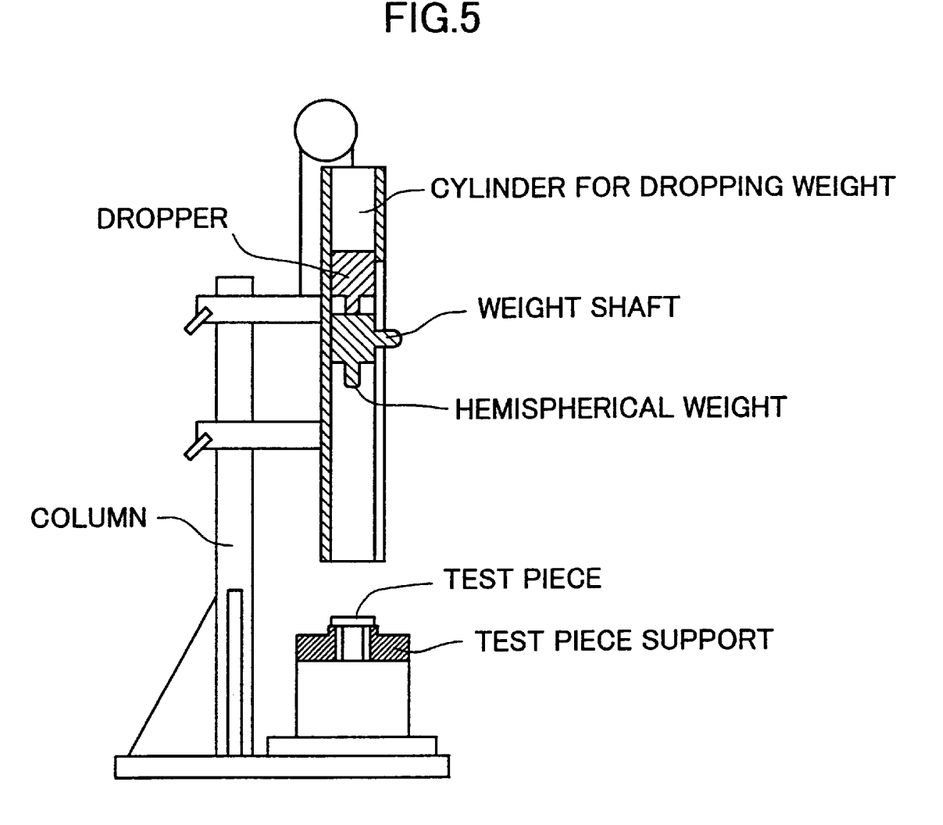
FIG. 5 is an illustration of a tester used for a drop-weight test.

X: Lifting or crimp on the design surface (v) Adhesiveness with the Back Coat Layer A test piece was prepared by laminating a single back coat layer on a gel coat layer to give a molding, and was subjected to a drop-weight test to evaluate the adhesiveness. The test piece was supported by a drop-weight tester as shown in FIG. 5, and a weight (500 g) was dropped from a height of 50 cm to one surface of the test piece where the gel coat layer was laminated and to the other surface thereof, respectively. The test piece after weight-drop was observed, and the adhesiveness was rated according to the following criteria:

Poor: Peeling of the gel coat layer

Good: No peeling of the gel coat layer (vi) Weather Resistance

A test piece was prepared by curing the resin composition to give a cured article. An initial E value ($E_1$) of the test piece, and an E value ($E_2$) of the test piece after 1000-hr irradiation with a weatherometer lamp were measured according to the method described in Japanese Industrial Standards (JIS) K5400, and a color difference ΔE [corresponding to ($E_1$–$E_2$)] was calculated.

In this evaluation, the E value means a value indicating a degree of yellowing, and the smaller ΔE is, the higher the weather resistance is.

[Preparation of Unsaturated Polyester 1 Having a Dicyclopentenyl Group]

A four-neck flask was charged with 196 parts of maleic anhydride, 278 parts of dicyclopentadiene (purity: 95%) and 36 parts of deionized water, and the resultant mixture was subjected to addition reaction at 130° C. under nitrogen flow for 3 hours to give an adduct of dicyclopentadiene with maleic acid. To this adduct, 392 parts of maleic anhydride, 592 parts of phthalic anhydride, and 718 parts of propylene glycol were added and admixed, and the resultant mixture underwent dehydration condensation reaction at 200° C. under nitrogen flow for 8 hours according to a conventional technique to give an unsaturated polyester having a dicyclopentenyl group with an acid value of 25 (Unsaturated Polyester 1) corresponding to the inventive component.

[Preparation of Unsaturated Polyester 2]

A four-neck flask was charged with 498 parts of isophthalic acid, 686 parts of maleic anhydride, 403 parts of propylene glycol, and 670 parts of dipropylene glycol, and the resultant mixture underwent dehydration condensation at 210° C. under nitrogen flow for 15 hours to give an unsaturated polyester having an acid value of 20 and a number average molecular weight of 2600 (Unsaturated Polyester 2)

[Preparation of Ultraviolet-Absorbing Polymer]

Into a four-neck flask equipped with a thermometer, a gas-blowing tube, a condenser, a dropping funnel and a stirrer were fed 100 parts of toluene as a solvent, and the charged was heated to 80° C.

Separately, the dropping device was charged with a monomer composition composed of 5 parts of 2-[2'-hydroxy-5'-(methacryloyloxyethyl)phenyl]-2H-benzotriazole (hereinafter briefly referred to as "benzotriazole") as an ultraviolet-absorbing monomer (1), 45 parts of cyclohexyl methacrylate as a cycloalkyl group-containing monomer (2), 150 parts of methyl methacrylate, 10.0 parts of 2-ethylhexyl acrylate, and 25.0 parts of n-butyl acrylate as monomers (a), and 0.2 part of t-butylperoxy-2-ethyl hexanoate.

The monomer composition was added dropwise over 2 hours to the charge in the four-neck flask. After the completion of the addition, the reaction mixture was kept at 80° C.

for 6 hours to give an ultraviolet-absorbing polymer solution. The ultraviolet-absorbing polymer solution had a nonvolatile matter content of 50%, and a number average molecular weight of the nonvolatile matter of 18000.

[Preparation of Unsaturated Polyester Resin Compositions, and Production of Moldings Therefrom]

A series of unsaturated polyester resin compositions (No. 1 to No. 5) were respectively prepared from 100 parts of the unsaturated polyester 1 having a dicyclopentenyl group, and methylhydroquinone, styrene monomer, methyl methacrylate monomer, poly(methyl methacrylate), cobalt octenoate, finely powdery silicic anhydride (trade name: #200 Aerosil, manufactured by Nippon Aerosil Co., Ltd., Japan) in the proportions indicated in Table 1. The viscosity at 25° C. of the individual unsaturated polyester resin compositions are shown in Table 1. The proportions of cobalt octenoate and silicic anhydride are shown by percentages relative to the finally prepared resin compositions.

A series of test pieces for the evaluation of the secondary adhesiveness as above were prepared by adding 0.8% of a methyl ethyl ketone peroxide-containing catalyst (trade name: Kayamec M, manufactured by Kayaku Acso Co., Ltd.) to each of the resin compositions. The secondary adhesiveness of these test pieces was evaluated. Table 1 shows the obtained evaluations.

TABLE 1

| | Resin composition No. | | | | |
|---|---|---|---|---|---|
| | 1 | 2 | 3 | 4 | 5 |
| Composition | | | | | |
| Unsaturated polyester 1 (part) | 100 | 100 | 100 | 100 | 100 |
| Styrene (part) | 70 | 72 | 70 | 70 | 72 |
| MMA (part) | 2 | — | 2 | 2 | — |
| PMMA (ppm) | 4000 | 20000 | 20000 | — | 4000 |
| Methylhydroquinone (part) | 0.034 | 0.034 | 0.034 | 0.034 | 0.034 |
| Cobalt octenoate (%) | 0.3 | 0.3 | 0.3 | 0.3 | 0.3 |
| Silica (%) | 1.0 | 1.0 | 1.0 | 1.0 | 1.0 |
| Viscosity (mPa · s) | 700 | 800 | 750 | 700 | 760 |
| Evaluation | | | | | |
| Bond strength (kN/m) | 140 | — | 50 | — | 50 |
| Fracture | Adherend failure | — | Interfacial peeling | — | Interfacial peeling |

As for the unsaturated polyester resin composition No. 2 (containing an excess amount of a thermoplastic polymer, and no polymerizable aliphatic vinyl monomer) and the resin composition No. 4 (containing no thermoplastic polymer), the first cured articles were peeled when test pieces were cut, and therefore their secondary adhesiveness could not be evaluated.

The resin composition No. 5 containing an adequate amount of a thermoplastic polymer but no polymerizable aliphatic vinyl monomer, and the resin composition No. 3 in which both a polymerizable aliphatic vinyl monomer and a thermoplastic polymer were contained, but the amount of the thermoplastic polymer was excessive, were low in bond strength and showed interfacial peeling.

On the contrary, the unsaturated polyester resin composition No. 1 corresponding to an inventive example was high in bond strength and underwent adherend failure when it was to be peeled.

[Production Process of Molding Having Weather Resistance]

An unsaturated polyester resin composition (No. 6) containing an ultraviolet-absorbing thermoplastic polymer was prepared by mixing the components (A), (B), (C) and (D), and hydroquinone in the proportion indicated in Table 2. Separately, an unsaturated polyester resin composition (No. 7) was prepared in the same manner as in the resin composition No. 6, except that the thermoplastic polymer was changed to PMMA.

To each of the prepared resin compositions No. 6 and No. 7 were added 0.3% of cobalt octenoate and successively 0.8% of a methyl ethyl ketone peroxide-containing polymerization catalyst (trade name: Kayamec M, manufactured by Kayaku Acso Co., Ltd.). Five plies of a glass fiber mats (trade name: CM455FA, manufactured by Asahi Fiber Co., Ltd., Japan) were laminated in a plate mold for the preparation of test pieces, and the laminate was impregnated with each of the resin compositions added with the polymerization catalyst, was degassed and the resin composition was cured to give a series of moldings. In this step, odor and cure property were evaluated.

Each of the moldings was subjected to after cure at 110° C. for 2 hours, was removed from the mold plate, and from this, a test piece 50 mm×50 mm in size was cut, and was subjected to the evaluation of weather resistance. As the evaluation of weather resistance, the test piece on a side in contact with the mold was irradiated with a weatherometer lamp, and $\Delta E$ was determined.

The resultant evaluations and the compositions of the resin compositions No. 6 and No. 7 are shown in Table 2.

Table 2 demonstrates that the inventive unsaturated polyester resin composition containing an ultraviolet-absorbing polymer showed less odor, excellent cure property, and that its molding was satisfactory in weather resistance.

TABLE 2

| Resin composition No. | | 6 | 7 |
|---|---|---|---|
| Component (A) (part) | Unsaturated polyester 1 | 100 | 100 |
| Component (B) (part) | Styrene | 70 | 70 |
| Component (C) (part) | MMA | 5 | 5 |
| Component (D) (ppm) | Ultraviolet-absorbing polymer | 4000 | — |
| | PMMA | — | 4000 |
| Hydroquinone (ppm) | | 100 | 100 |
| Evaluation | Odor | 40 | 40 |
| | Cure property | good | good |
| | Weather resistance ($\Delta E$) | 10 | 20 |

[Production Process of a Molding Having a Back Coat Layer Formed from an Unsaturated Polyester Resin Composition Having a Dicyclopentenyl Group]

Gel coating resin compositions and back coating resin compositions having compositions indicated in Table 3 were prepared, and moldings No. 1 and No. 2 were produced using these compositions.

The gel coat layer was formed in the following manner: To the unsaturated polyester resin composition shown in Table 1 were added 0.3% of cobalt octenoate and successively 0.8% of a methyl ethyl ketone peroxide-containing polymerization catalyst (trade name: Kayamec M, manufactured by Kayaku Acso Co., Ltd.). The resultant composition was applied, to a thickness of 0.3 mm, onto a plate mold for the preparation of test pieces, and was allowed to stand under an atmosphere at 27° C. for 65 minutes thereby to be cured. Next, five plies of a glass fiber mat (trade name: CM455FA, manufactured by Asahi Fiber Co., Ltd.) were laminated onto a lamination surface (a surface on a side not in contact with the mold) of the gel coat layer, and the laminate was impregnated with a back coating resin composition, and was degassed and then was subjected to cure reaction for 15 hours to form a back coat layer. In the course of the production of this molded laminate, odor, cure property and lifting were evaluated.

The moldings No. 1 and No. 2 were subjected to after cure at 110° C. for 2 hours, and then were subjected to the evaluations of the adhesiveness with the back coat layer, and the weather resistance. As the evaluation of weather resistance, the test piece on a gel coat layer side was irradiated with a weatherometer lamp, and ΔE was determined.

The obtained evaluations and the compositions of the gel coating resin compositions and back coating resin compositions are set forth in Table 3. The "silica" in Table 3 was #200 Aerosil (trade name) available from Nippon Aerosil Co., Ltd.

TABLE 3

| Molding No. | | 1 | 2 |
|---|---|---|---|
| Gel coating resin composition | Unsaturated polyester 2 (part) | 100 | 100 |
| | styrene (part) | 40 | 40 |
| | MMA (part) | 40 | 40 |
| | PMMA (ppm) | 8000 | — |
| | Ultraviolet-absorbing polymer | — | 400 |
| | Hydroquinone (part) | 0.018 | 0.018 |
| | Titanium white (part) | 5 | 5 |
| | Silica (%) | 2.5 | 2.5 |
| | viscosity (mPa · s) | 2000 | 2000 |
| Back coating resin composition | Unsaturated polyester 1 (part) | 100 | 100 |
| | Styrene (part) | 70 | 70 |
| | MMA (part) | 2 | 2 |
| | PMMA (part) | 4000 | 4000 |
| | hydroquinone (part) | 0.034 | 0.034 |
| | Cobalt octenoate (%) | 0.3 | 0.3 |
| | Dimetylaniline (ppm) | 200 | 200 |
| | Silica (%) | 1.0 | 1.0 |
| | viscosity (mPa · s) | 700 | 700 |
| Evaluation | Odor of gel coat layer (ppm) | 60 | 70 |
| | Odor of back coat layer (ppm) | 50 | 50 |
| | Cure property | good | Good |
| | Lifting | ○ | ○ |
| | Adhesiveness with back coat layer | good | Good |
| | Weather resistance | 10 | 2 |

In both moldings, the odor and lifting were negligible, and the cure property and adhesiveness with the back coat were satisfactory, as the material unsaturated polyester resin compositions each contained a thermoplastic polymer. In addition, the molding No. 2 whose gel coating resin composition contained an ultraviolet-absorbing polymer was excellent in weather resistance.

The inventive unsaturated polyester resin composition is low in volatility and can be used in open molds, and is rapid in dry hard. In addition, it can advantageously be used for the production of molded laminates and joint monolithic moldings, because the secondary adhesiveness of its first cured article is satisfactorily high.

Other embodiments and variations will be obvious to those skilled in the art, and this invention is not to be limited to the specific matters stated above.

What is claimed is:

1. An unsaturated polyester resin composition comprising:
   (A) 100 parts by weight of an unsaturated polyester having a dicyclopentenyl group;
   (B) 20 to 100 parts by weight of a polymerizable aromatic vinyl monomer;
   (C) 0.5 to 20 parts by weight of a polymerizable aliphatic vinyl monomer; and
   (D) 50 to 10000 ppm of a thermoplastic polymer based on the total weight of said components (A), (B) and (C), said thermoplastic polymer being soluble in said polymerizable aliphatic vinyl monomer, and the weight ratio (D/C) of said component (D) to said component (C) being equal to or less than ⅕.

2. A composition according to claim 1, wherein said polymerizable aliphatic vinyl monomer is methyl methacrylate.

3. A composition according to claim 1, wherein said thermoplastic polymer is poly(methyl methacrylate).

4. A composition according to claim 1, wherein said thermoplastic polymer is an ultraviolet-absorbing thermoplastic polymer having an ultraviolet-absorbing monomeric unit represented by the following formula (1):

wherein $R^1$ is a hydrogen atom or a hydrocarbon group having 1 to 8 carbon atoms, $R^2$ is a linear- or branched-chain alkylene group having 1 to 6 carbon atoms, $R^3$ is a hydrogen atom or a methyl group, and X is a hydrogen atom, a halogen atom, a hydrocarbon group having 1 to 8 carbon atoms, an alkoxy group having 1 to 4 carbon atoms, a cyano group or a nitro group.

5. A molding produced by the use of an unsaturated polyester resin composition of claim 1.

6. A molding according to claim 5, comprising a gel coat layer and a back coat layer laminated on the back of said gel coat layer, wherein said back coat layer is a molding produced by the use of an unsaturated polyester resin composition of claim 1.

7. A molding according to claim 6, wherein said gel coat layer is a cured article of an unsaturated polyester resin composition comprising an unsaturated polyester resin and a thermoplastic polymer, the content of said thermoplastic polymer is 20 to 10000 ppm based on the weight of said unsaturated polyester resin.

8. A molding according to claim 7, wherein said thermoplastic polymer is an ultraviolet-absorbing thermoplastic polymer having an ultraviolet-absorbing monomeric unit represented by the following formula (1):

(1)

wherein $R^1$ is a hydrogen atom or a hydrocarbon group having 1 to 8 carbon atoms, $R^2$ is a linear- or branched-chain alkylene group having 1 to 6 carbon atoms, $R^3$ is a hydrogen atom or a methyl group, and X is a hydrogen atom, a halogen atom, a hydrocarbon group having 1 to 8 carbon atoms, an alkoxy group having 1 to 4 carbon atoms, a cyano group or a nitro group.

9. A process for the production of a molding, said process comprising the steps of:
curing an unsaturated polyester resin composition of claim 1 in an open mold to form a first cured article; and
applying another portion of the unsaturated polyester resin composition of claim 1 onto an air-contact surface of said first cured article, and curing said applied resin to form a laminate.

10. A process for the production of a molding, said process comprising the steps of:
forming a gel coat layer in an open mold; and
applying an unsaturated polyester resin composition of claim 1 onto an air-contact surface of said gel coat layer, and curing said applied resin to form a back coat layer.

* * * * *